US008868565B1

(12) United States Patent
Zhong et al.

(10) Patent No.: US 8,868,565 B1
(45) Date of Patent: Oct. 21, 2014

(54) CALIBRATING CLICK DURATION ACCORDING TO CONTEXT

(71) Applicant: Google Inc., Mountain View, CA (US)

(72) Inventors: Qian Zhong, San Jose, CA (US); Rehan Khan, Lafayette, CA (US)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 13/664,016

(22) Filed: Oct. 30, 2012

(51) Int. Cl.
G06F 17/30 (2006.01)

(52) U.S. Cl.
CPC .... *G06F 17/30707* (2013.01); *G06F 17/30595* (2013.01)
USPC .......................................... 707/740; 707/769

(58) Field of Classification Search
USPC .................. 707/1, 5, 711, 713, 759, 728, 769
See application file for complete search history.

(56) References Cited

U.S. PATENT DOCUMENTS

| 7,769,751 | B1 * | 8/2010 | Wu et al. ........................ 707/728 |
| 8,145,623 | B1 * | 3/2012 | Mehta et al. ................... 707/713 |
| 2006/0224554 | A1 * | 10/2006 | Bailey et al. ....................... 707/1 |
| 2007/0038620 | A1 * | 2/2007 | Ka et al. ............................ 707/5 |
| 2008/0052629 | A1 | 2/2008 | Phillips et al. |
| 2008/0259025 | A1 * | 10/2008 | Eom .............................. 345/156 |
| 2008/0306830 | A1 | 12/2008 | Lasa et al. |
| 2009/0265290 | A1 | 10/2009 | Ciaramita et al. |
| 2010/0218112 | A1 | 8/2010 | Park et al. |
| 2010/0262605 | A1 * | 10/2010 | Mikawa ........................ 707/740 |
| 2010/0306224 | A1 * | 12/2010 | Ciemiewicz et al. ......... 707/759 |
| 2011/0173180 | A1 * | 7/2011 | Gurumurthy et al. ........ 707/711 |
| 2011/0307464 | A1 * | 12/2011 | Ghosh .......................... 707/706 |
| 2012/0143790 | A1 | 6/2012 | Wang et al. |
| 2013/0046772 | A1 * | 2/2013 | Gu et al. ....................... 707/751 |
| 2013/0091165 | A1 * | 4/2013 | Han et al. ..................... 707/769 |
| 2013/0159298 | A1 * | 6/2013 | Mason et al. ................. 707/728 |

* cited by examiner

*Primary Examiner* — James Trujillo
*Assistant Examiner* — Thong Vu
(74) *Attorney, Agent, or Firm* — Fish & Richardson P.C.

(57) ABSTRACT

Methods, systems, and apparatus, including computer programs encoded on a computer storage medium, for determining short click measures and long click measures on a per-category basis. In one aspect, a method includes determining, for each of a set of categories, a respective first threshold click duration that is a long click duration that defines a period of time for which click durations resulting from selections of resources that belong to the category and that meet the first threshold click duration are classified as long clicks, and a respective second threshold click duration is a short click duration that defines a period of time for which click durations resulting from selections of resources that belong to the category and that do not meet the second threshold click duration are classified as short clicks.

18 Claims, 5 Drawing Sheets

CALIBRATING CLICK DURATION ACCORDING TO CONTEXT

BACKGROUND

This specification relates to determining resource quality.

The Internet enables access to a wide variety of content, e.g., video and/or audio files, webpages for particular subjects, news articles, etc. Such access to content has also led to the providing of additional content items with the content. For example, online advertising involves the providing of advertising content items with resources served over the Internet.

The user interactions with resources referenced by the content items are often indicative of the user's satisfaction with the underlying resources. For example, how a user reacts to a landing page of an advertisement may be used as a quality signal of the advertisement. One such interaction is a "click duration." A "click duration" is an amount of time a user device displays a resource after the resource (e.g., a webpage) is rendered at the user device. The click duration is indicative of the quality of the webpage. Click durations can be classified as belonging to short clicks and long clicks. Short clicks occur when a user device requests a webpage and then "leaves" the webpage within a pre-specified short-click duration. Conversely, long clicks occur when a user device requests a webpage and "remains" on the webpage in excess of a pre-specified long-click duration. The long click duration is typically longer than the short click duration. All other quality factors being equal, a webpage that is associated with a much higher number of short-clicks relative to the number of long clicks will receive a lower quality score than a webpage that is associated with a much higher number of long-clicks relative to the number of short clicks.

SUMMARY

In general, one innovative aspect of the subject matter described in this specification can be embodied in methods that include the actions of selecting a first quality measure threshold and a second quality measure threshold that is different from the first quality measure threshold; for each of a plurality of categories: determining, for the first quality measure threshold, a first threshold click duration from click durations resulting from selections of first resources that are each categorized as belonging to the category, and wherein each of the first resources has a quality measure that corresponds to the first quality measure threshold, and determining, for the second quality measure threshold, a second threshold click duration from click durations resulting from selections of second resources that are each categorized as belonging to the category, and wherein each of the second resources has a quality measure that corresponds to the second quality measure threshold; wherein the first threshold click duration is a long click duration that defines a period of time for which click durations resulting from selections of resources that belong to the category and that meet the first threshold click duration are classified as long clicks, and wherein the second threshold click duration is a short click duration that defines a period of time for which click durations resulting from selections of resources that belong to the category and that do not meet the second threshold click duration are classified as short clicks, and wherein the determined first threshold click durations are different for at least two of the categories, and the determined second threshold click durations are different for at least two of the categories. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The calibration of click durations on a per-category basis reduces the effect of behavioral biases that are exhibited by category audiences. The calibration of durations on the per-category basis provides a better model of durations as a quality signal than using global durations across all categories. This, in turn, reduces the effect of behavior biases in ranking models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

As described above, click durations are a measure of quality of a resource. Other measures of quality are also used to determine the quality of a resource. Such other measures may include the textual content, formatting, incoming and outgoing link analysis, and other such features.

The relationship of click behavior to quality may vary based on a category to which the webpage belongs. A category, as used in this specification, is a constituent classification in any one of appropriate organizational schemes. For example, categories can be predefined, such as business vertical categories, categories identified by semantic content, and so on. Alternatively, categories can be emergent, such as observed groupings of content based on behavioral signals of a viewing audience.

In particular, the click behavior of users viewing webpages within a particular quality range in a particular category may differ from the click behavior of users viewing webpages within the particular quality range in a different particular category. For example, given a set of quality criteria, pages belonging to a "real estate" and a "news" category are scored. The click behavior of users in each category may reveal that user spend, on average, different amounts of time on pages belonging to different categories but of similar quality scores.

Accordingly, within the same category, short click measurements and long click measurement of webpages typically correlate to quality scores of the webpages within the category. However, if the same short click duration and long click duration are used across categories, the short click measurements and long click measurement of the webpages may not correlate to similar quality scores of the webpages across the categories.

The subject matter of this application generates short and long click durations on a per-category basis instead of generating a global short click duration and long click duration for all webpages across all categories. In particular, the subject matter of this application selects, for each category, a short click duration and long click duration for the category, and the short click durations and long click durations for each respective category may differ.

To generate the short click durations and the long click durations, a system selects a first quality measure threshold and a second quality measure threshold that is greater than the first quality measure threshold. The first quality measure threshold is used to calibrate short click durations on a per-category basis, and the second quality measure threshold is used to calibrate long click durations on a per-category basis.

Example Operating Environment

Figure 1:
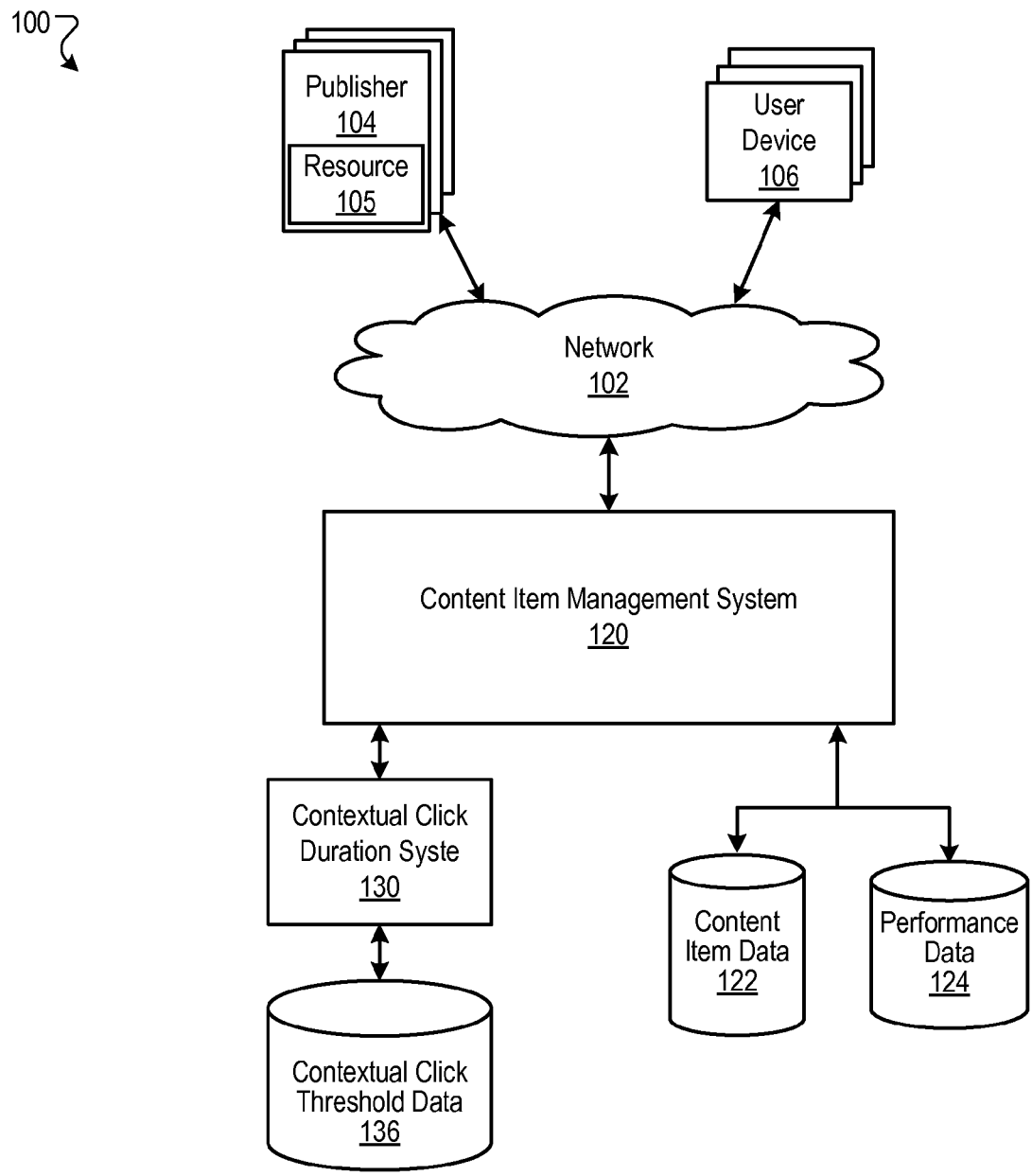
FIG. 1 is a block diagram of an environment in which contextual click duration data are determined.

FIG. 1 is a block diagram of an example environment 100 in which contextual click duration data are determined. A computer network 102, such as a local area network (LAN), wide area network (WAN), the Internet, or a combination thereof, connects publisher web sites 104, user devices 106, and a content item management system 120. The online environment 100 may include many thousands of publisher web sites 104 and user devices 106.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a webpage at a website on the world wide web or a local area network.

The content item management system 120 facilitates the provisioning of content items that are shown with the resources 105. One example content item management system is an advertisement management system that allows advertisers to define selection rules that take into account attributes of the particular user to provide targeted advertisements for the users. Example selection rules include keyword selection, in which advertiser provide bids for keywords that are present in either search queries (for search result pages) or webpage content (for webpages of particular subject matter).

Advertisements that are associated with keywords having bids that result in an advertisement slot being awarded in response to an auction are selected for displaying in the advertisement slots. When a user of a user device 106 selects an advertisement, the user device 106 generates a request for a landing page of the advertisement, which is typically a webpage of the advertiser. For example, the publishers 104 may include advertisers, each having hosting respective webpages, some of which are landing pages for the advertisements of the advertisers. A resource 105 from a publisher 104 includes instructions that cause the user device to request advertisements from the advertisement management system 120. The request includes a publisher identifier and, optionally, keyword identifiers related to the content of the resource 105. The content item management system 120, in turn, provides targeted advertisements to the particular user device.

The publisher 104 and/or the content item management system 120 can also provide instructions that are served with the resource and/or advertisement, and with the landing page of the advertisement. These instructions cause the user device 106 to report various analytical data back to the content item management system 120. Such analytical data includes referring information, actions taken at the resource and at the landing page by the user of the user device, timestamps associated with each action, and other user interaction information.

The content item management system 120 includes a data storage system that stores content item data 122 and performance data 124. The content item data 122 stores content items, targeting information, and other information for content item sponsors. For example, in the case of an advertising system, the content item data 122 can be campaign data storing advertisements, targeting information, budgeting information for advertisers. The performance data 124 stores data indicating the performance of the content items that are served. Such performance data can include, for example, click through rates for content items, the number of impressions for content items, and click duration information of a landing page for each content item (such as a total number of short clicks, a total number of long clicks, short click ratios, long click ratios, click duration central tendencies, etc.), and so on. Other performance data can also be stored.

In the case of advertisements, the content item data 122 and the performance data 124 are used as input parameters to an advertisement auction. In particular, the content item management system 120, in response to each request for advertisements, conducts an auction to select advertisements that are provided in response to the request. The auction receives as input, for each advertisement, a bid for the advertisement (such as a cost per click or cost per impression), targeting information, and quality data. The targeting information may, for example, include keywords, demographic data, and other targeting information. The quality information may include quality metric values for a landing page associated with the advertisement. Such metric values may include short click measurement data and long click measurement data, along with other information. These data are used to generate an auction score for each advertisement, and the advertisements with the highest auction scores are selected to respond to the advertisement request.

Selecting Contextual Click Duration According to Context

As described above, click durations, either long or short, are a measure of user satisfaction or dissatisfaction. User satisfaction as measured by click durations, however, may vary based on a category. Accordingly, in some implementations, a contextual click duration system 130 generates short and long click durations on a per-category basis instead of generating a global short click duration and long click duration for all webpages across all categories. This information is provided to the management system 120 for content item selection. Although shown as a system separate from the management system 120, the contextual click duration system 130 can also be implemented as a subsystem of the management system 120.

In particular, the contextual click duration system 130 selects, for each category, a short click duration and long click duration for the category. For each of a set of categories, first resources having a quality measure that corresponds to the first quality measure threshold are selected. The correspondence may be, for example, a range of quality measures. For example, if the first quality measure threshold is 1.25, resources having a quality measure in the range of 1.225-1.275 may be selected. Other appropriate correspondence relations may be used. A first threshold click duration from click durations resulting from selections of selected first resources that are each categorized as belonging to the category is then determined. Thus, for each category, a respective short click duration is determined.

Likewise, second resources having a quality measure that corresponds to the second quality measure threshold are selected. A second threshold click duration from click durations resulting from selections of second resources that are each categorized as belonging to the category is determined. Thus, for each category, a respective long click duration is determined.

The duration system 130 can be implemented in a data processing apparatus of one or more computers and a memory storage system in data communication with the data processing apparatus and that stores data and instructions that cause the data processing apparatus to perform the operations described below. Example processing flows of the duration system 130 are described with reference to FIGS. 2A, 3 and 4A.

Figure 2A:
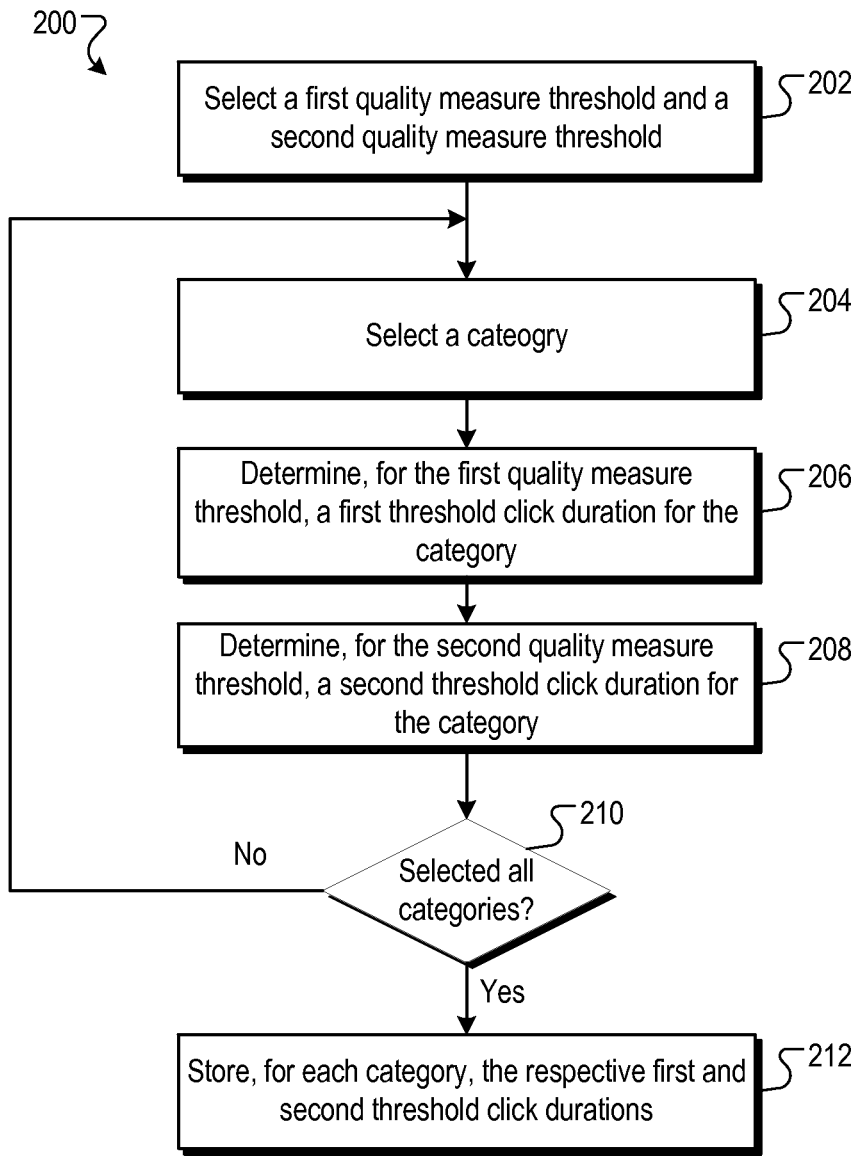
FIG. 2A is a flow diagram of an example process for determining respective threshold click durations for a plurality of categories.

FIG. 2A is a flow diagram of an example process 200 for determining respective threshold click durations for a plurality of categories. The process 200 is used to select, for example, a short click duration and a long click duration for each of a set of categories.

The process 200 selects a first quality measure threshold and a second quality measure threshold (202). The quality threshold may, for example, be derived from quality scores calculated for landing pages. One example process for determining quality score thresholds is described with reference to FIGS. 4A-4C below. The first quality threshold is different from the second quality threshold; for example, the quality threshold may be a quality score for landing pages where the first quality threshold is a "high quality" threshold, and the second quality threshold is a "low quality" threshold.

For each of a set of categories (as illustrated by the process loop of selection 204 and decision 210), the process 200 determines, for the first quality measure threshold, a first threshold click duration for the category (206). The first threshold click duration is determined from click durations resulting from selections of first resources that are each categorized as belonging to the category, and that each have a quality measure that corresponds to the first quality measure threshold.

Figure 2B:
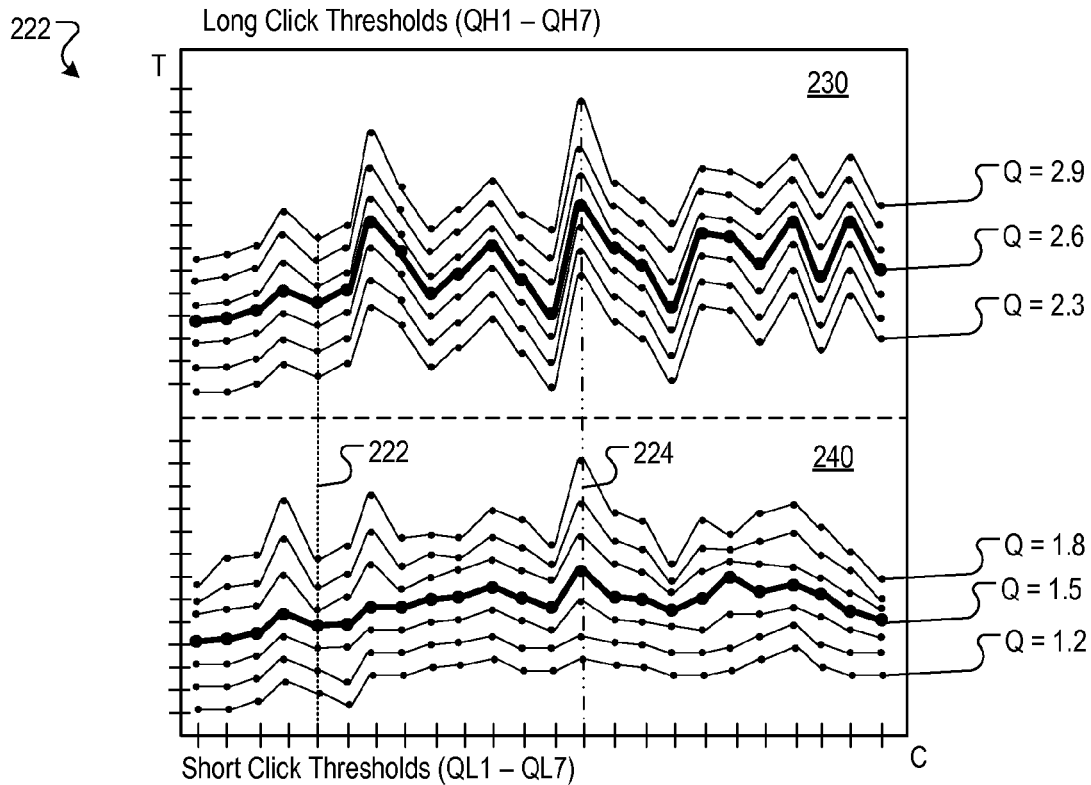
FIG. 2B is a graph of an example relation specifying durations of a first quality threshold and durations of a second quality threshold, for a plurality of categories and a plurality of quality scores.

This determination is described with reference to FIG. 2B, which is a graph 220 that illustrates an example relation specifying click durations T for a set of categories C and a set of quality scores. Each point on the x-axis is for a particular category C, and the vertical distributions represent click durations resulting from selections of resources in the category for various quality score ranges. In other words, each vertical distribution of click durations represents a relation of click behavior to quality for the particular category C. Note that for fore each category C, as the quality score increases, so does the corresponding click duration time T.

There are two regions—230 and 240. Region 230 corresponds to "long click" thresholds, and region 240 corresponds to "short click" thresholds. With reference to FIG. 2B, region 230 of the graph 220 shows, for each category C, a series of seven different click durations for resources of particular quality scores that belong to the category. Assume the quality scores range, for example, from 2.3-2.9, with 2.3 represented by the lowest value shown for the categories and 2.9 represented by the highest value shown for the categories. The quality scores are illustrative only and any quality score distribution can be used, depending on the quality scoring process used.

For example, for the category represented by the line 222, the first click duration at the bottom of the region 230 corresponds to a central tendency of click durations for resources that have a quality score in the range of, for example, 2.25-2.349; the second click duration that is second from the bottom in the region 230 corresponds to a central tendency of click durations for resources that have a quality score in the range of, for example, 2.35-2.449; and so on. The central tendency value can be an average, a median, etc.

Note that for the category represented by the line 224, click durations are also shown for resources having quality scores in the range of 2.3-2.9. However, the click durations are longer for the category represented by the line 224 than for the category represented by the line 222. This is because users spend, on average, different amounts of time on pages belonging to different categories.

Assuming that the first quality threshold selected is 2.6, which corresponds to the values distributed along the bold line in the top region 230 of the graph 220, a click duration that corresponds to the threshold of 2.6 is selected for each category. For example, for the category represented by the line 222, the long click duration may be 210 seconds; however, for the category represented by the line 224, the long click duration may be 300 seconds.

Likewise, for each of the categories (selection 204 and decision 210), the process 200 determines, for the second quality measure threshold, a second threshold click duration for the category (208). The process is similar to step 206, except that the second quality measure is lower than the first quality measure. For example, in the bottom portion 240 of the graph 200, central tendencies of click durations for resources that have a quality score in the range of, for example, 1.2-1.8 are shown. The second threshold is, for example, 1.5, which corresponds to the values distributed along the bold line in the bottom region 240 of the graph 220, resulting in different short click duration thresholds for each category. For example, for the category represented by the line 222, the short click duration may be 20 seconds; however, for the category represented by the line 224, the short click duration may be 40 seconds.

After the categories are processed (210), the process 200 stores, for each category, the respective first and second threshold click durations (212). The stored click durations can be used in a variety of different operations. For example, one such operation in the context of advertisements is a selection process that rates an advertisement, in part, based on short click and long click measurements of a landing page to which the advertisement links. For example, for the category represented by the line 222, the short click and long click durations are 20 seconds and 210 seconds, respectively. Each time a landing page belonging to that category is selected, a short click is counted when a click duration for a selection of the landing page does not meet the short click duration, i.e., less than 20 seconds. Likewise, each time a landing page belonging to that category is selected, a long click is counted when a click duration for a selection of the landing page meets the long click duration, i.e., 210 seconds or longer.

Figure 3:
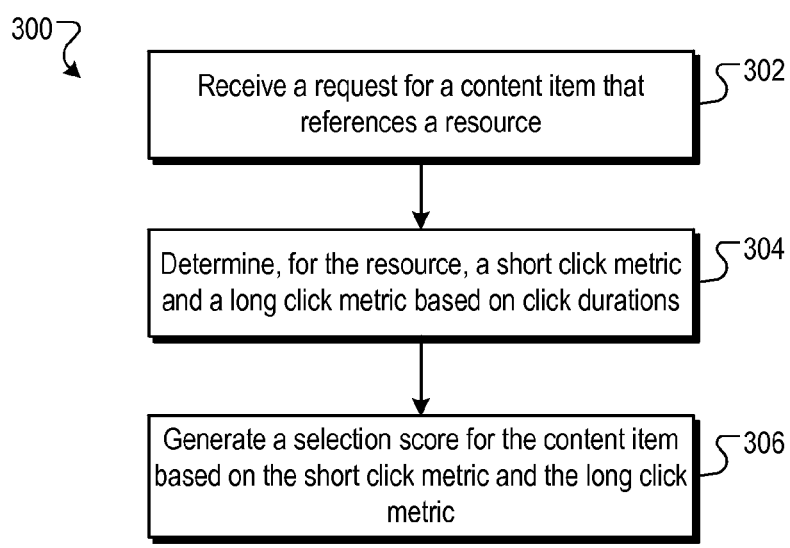
FIG. 3 is a flow diagram of an example process for generating a selection score for a content item.
Figure 4A:
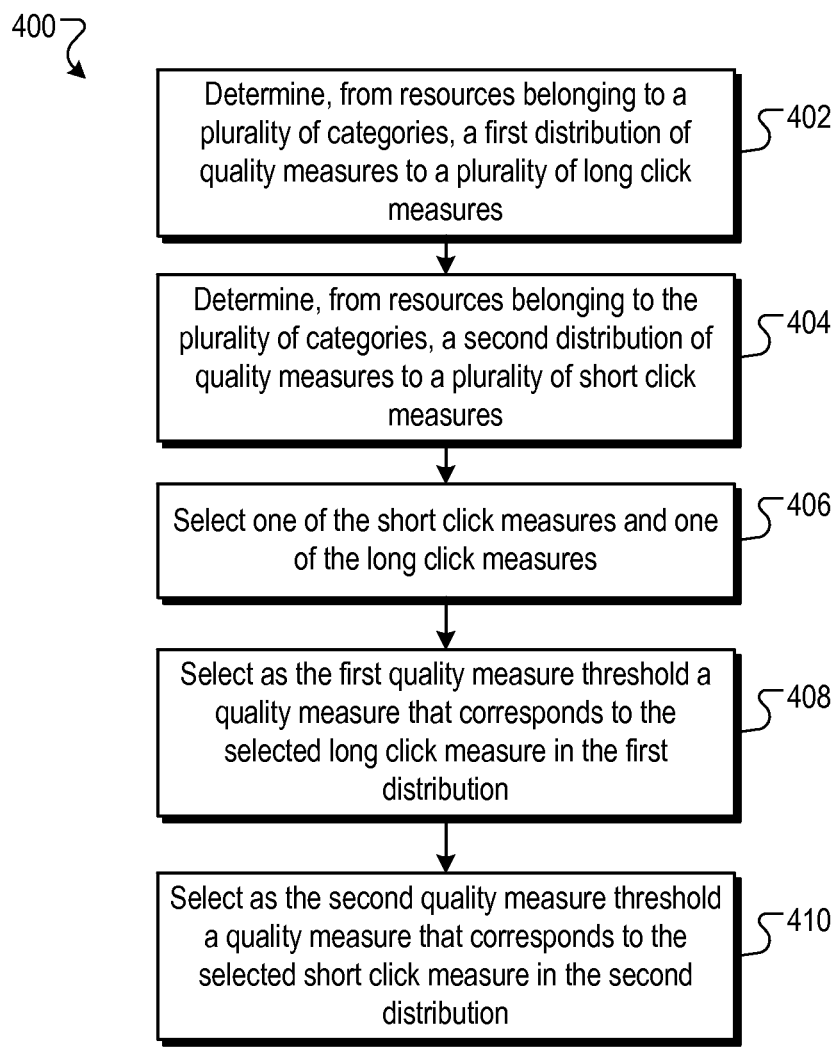
FIG. 4A is a flow diagram of an example process for selecting a first quality measure threshold and a second quality measure threshold based on a first distribution of quality measures to short-click measures and a second distribution of quality measures to long-click measures, respectively.

These values are then used to determine corresponding short and long click metrics for a selection process. For example, FIG. 3 is a flow diagram of an example process 300 for generating a selection score for a content item. The process 300 can be used in the content item management system 110.

The process 300 receives a request for a content item that references a resource (302). For example an advertisement request may be received, and among the eligible advertisements are advertisements that link to landing pages. Each landing page belongs to one of the categories for which a corresponding short click threshold and long click threshold has been determined.

The process 300 determines, for the resource, a short click metric and a long click metric based on click durations (304). The click durations are durations form selections of content items referencing the resource. The metrics are based on these durations, and the first and second click durations for the category to which the resource belongs. For example, the number of short clicks, long clicks and all clicks received may be determined, and corresponding ratios of short and long clicks may also be determined.

The process 300 generates a selection score for the content item based, in part, on the short click metric and a long click metric (306). The selection score is used to rank the content item for selection in response to the request. For example, assuming all features for two landing pages are equal except for short and long click metrics, the advertisement referencing the landing page that has the higher indication of user satisfaction from the short and long click metrics of the two landing pages will be rated the higher of the two advertisements.

Selecting Quality Scores for Click Duration Selection

As described above, the duration system 130, in some implementations, selects first and second quality measure threshold and uses these two measures across all categories to select the first and second click thresholds. There are a variety of appropriate ways the two quality measures can be selected, one of which is described with reference to FIG. 4A, which is a flow diagram of an example process 400 for selecting a first quality measure threshold and a second quality measure threshold based on a first distribution of quality measures to long-click measures and a second distribution of quality measures to short-click measures, respectively. Description of the process 400 is also described with reference to FIGS. 4B and 4C, which are graphs illustrating distributions of quality measures to short-click measures and long-click measures, respectively.

The process 400 determines, from the resources belonging to a plurality of the categories, a first distribution of quality measures to a plurality of long click measures (402) and a second distribution of quality measures to a plurality of short click measures (404). Each long click measure corresponds to a corresponding quality measure in the first distribution, and each short click measure corresponds to a corresponding quality measure in the second distribution. The quality measures may be, for example, landing page scores for landing pages of multiple categories.

Figure 4B:
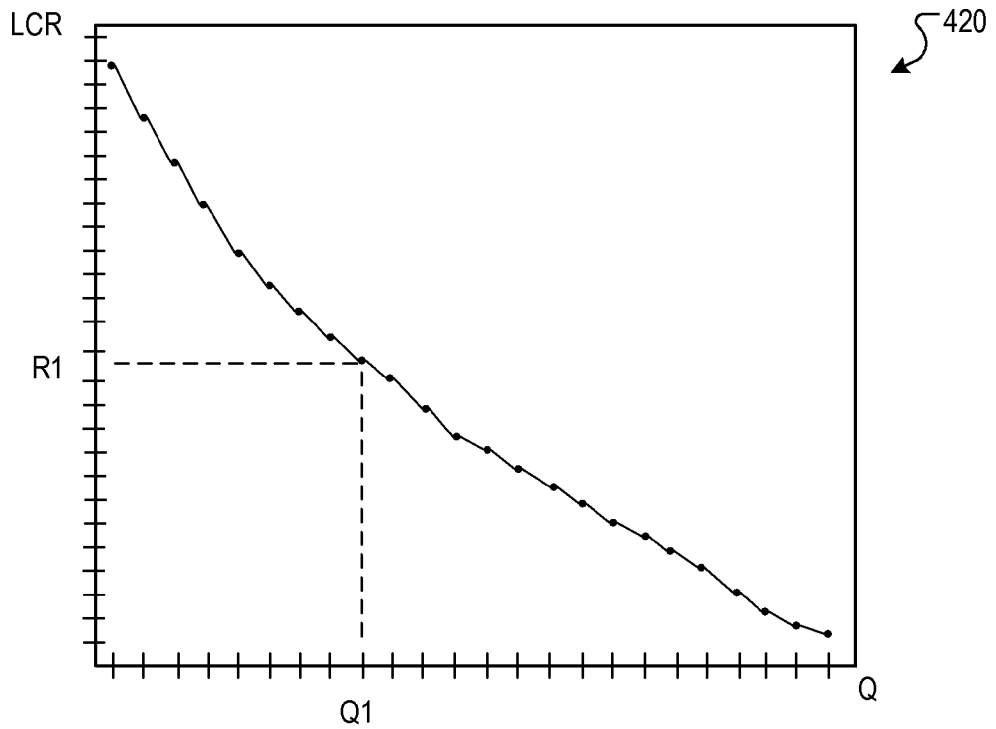
FIGS. 4B and 4C are graphs illustrating distributions of quality measures to long-click measures and short-click measures, respectively.
Figure 4C:
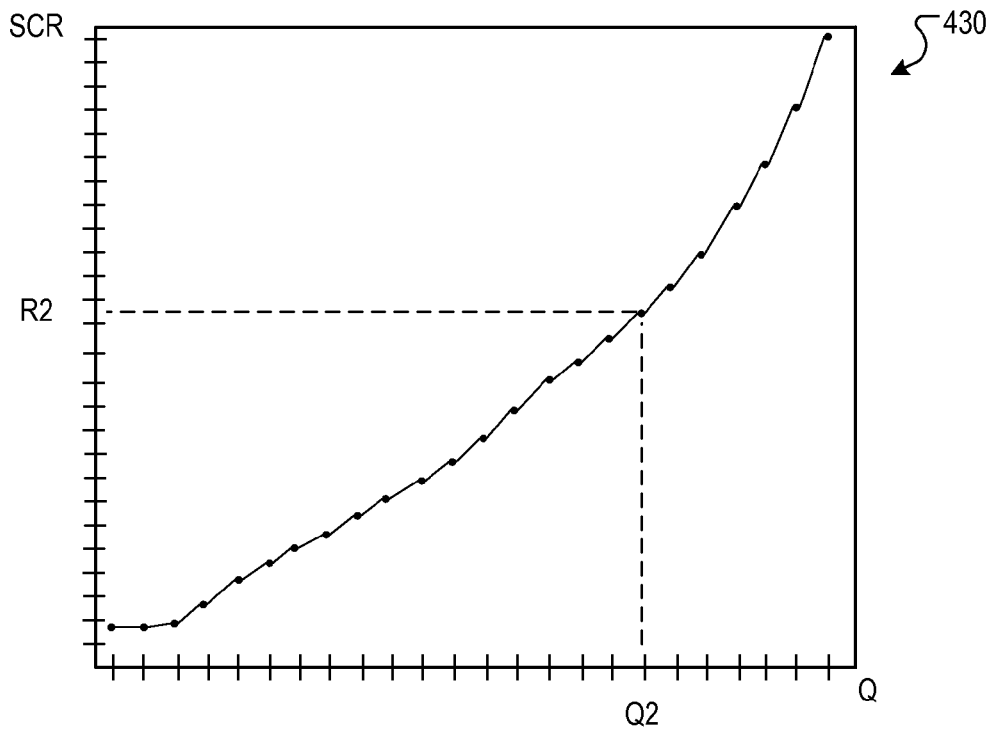

Examples distributions are illustrated in the graph 420 of FIG. 4B and 430 of FIG. 4C. The graph 420 shows the long click ratio for various landing page quality scores across multiple categories. The resulting distribution in terms of long click ratios indicates that as the quality score increases, the corresponding cutoff time increases, and thus the long click ratio decreases. Likewise, with respect to the graph 430, as the quality score increases, the corresponding cutoff time increases, and thus the short click ratio increases.

The process 400 then selects one of the short click measures and one of the long click measures (406). For example, a desired short click ratio and long click ratio may be specified by system administrators, e.g., system administrators may desire that an average or some other central tendency across all categories for the short click ratio be a first ratio and for the long click ratio be a second ratio. A variety of appropriate ratios values can be used. As shown in FIGS. 4B and 4C, ratio R1 is used for the long click ratio and ratio R2 is used for the short click ratio.

The process 400 selects as the first quality measure threshold a quality measure that corresponds to the selected long click measure in the first distribution (408). For example, with reference to FIG. 4B, the desired long click ratio LCR is indicated by the value R1. The corresponding quality measure is thus Q1. Referring back to FIG. 2B, for example, the bold line in the upper region 230 of the graph 220 corresponds to long click thresholds in various categories for resources having a quality score corresponding to Q1.

The process 400 selects as the second quality measure threshold a quality measure that corresponds to the selected short click measure in the second distribution (410). For example, with reference to FIG. 4C, assume the desired short click ratio SCR is indicated by the value R2. The corresponding quality measure is thus Q2. Referring back to FIG. 2B, the bold line in the lower region 240 of the graph 220 corresponds to short click thresholds in various categories for resources having a quality score corresponding to Q2.

The process 400 is one example way by which a first quality measure threshold can be selected for determining a long click threshold across different categories, and a second quality measure threshold can be selected for determining a short click threshold across different categories. Other appropriate selection processes can also be used.

Additional Implementation Details

The examples described above are illustrative only, and quality measure thresholds can be determined by other appropriate techniques. Furthermore, in some implementations, the quality measure thresholds for each category may vary. For example, a system administrator may specify that a first collection resources in a category be used to determine a quality threshold for short clicks, and a second collection of resources in the category be used to determine a quality measure for long clicks. From these collections, corresponding short click and long click durations for the category may be determined. More generally, any appropriate distribution of a click measure (such as short or long click ratio, average click duration, etc.) to corresponding quality measures (such as landing page quality scores, advertisement quality scores, etc.) can be used to calibrate click durations on a category-by-category basis.

Although the subject matter is described above in the context of a landing page score, other measures can also be used as reference scores. In the case of advertising, for example, one such measure is a creative quality score. Any appropriate qualitative measure by which click durations can be modeled can thus be used to select click durations.

Although only two click durations—a short click and a long click—are described above, multiple click durations can be selected. For example, a system can be configured to have five click durations—a very short click duration, a short click duration, a medium click duration, a long click duration, and a very long click duration. Thus, by deriving the relationship between click duration and the quality measure, a system may calibrate any click duration to a standard quality measure.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's user device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, comprising:
   identifying user click durations for resources corresponding to a first resource quality measure and identifying user click durations for resources corresponding to a second resource quality measure that is different from the first quality measure, each of the user click durations for a resource being a measure of elapsed time that the first resource is displayed at a user device following a selection of the resource;
   for each of a plurality of resource categories:
      determining based on the user click duration from click durations for first resources that are each categorized as belonging to the resource category and that have a quality measure that is within a threshold range of the first resource quality measure, a short click duration specifying a first threshold click duration that is used to classify a user click duration as a short click; and
      determining, based on the user click duration from click durations for second resources that are each categorized as belonging to the resource category and that have a quality measure that is within a threshold range of the second resource quality measure, a long click duration specifying a second threshold click duration that is used to classify a user click duration as a long click;
   wherein the determined short click durations are different for at least two of the categories, and the determined long click durations are different for at least two of the categories; and
   classifying a user click duration corresponding to a selection of a resource from one of the categories based, at least in part, on the short click duration and the long click duration for the one of the categories.

2. The method of claim 1, wherein, for each of the plurality of categories:
   determining a short click duration comprises:
      determining as the first threshold click duration a central tendency of click durations resulting from selections of the first resources;
   determining a long click duration comprises:
      determining as the second threshold click duration a central tendency of click durations resulting from selections of the second resources.

3. The method of claim 2, further comprising:
   receiving a request for a content item that references a resource that belongs to one of the categories;
   determining, for the resource, a short click metric and a long click metric based on click durations resulting from selections of content items referencing the resource and the short and long click durations for the category to which the resource belongs; and
   generating a selection score for the content item based, in part, on the short click metric and a long click metric, the selection score being used to rank the content item for selection in response to the request.

4. The method of claim 1, wherein selecting the first quality measure and the second quality measure comprises:
   determining, from resources belonging to the plurality of the categories, a first distribution of quality measures to a plurality of long click measures, each long click measure corresponding to a corresponding quality measure in the first distribution;
   determining, from the resources belonging to the plurality of the categories, a second distribution of quality measures to a plurality of short click measures, each short click corresponding to a corresponding quality measure in the second distribution;
   selecting one of the short click measures and one of the long click measures;
   selecting as the first quality measure a quality measure that corresponds to the selected long click measure in the first distribution; and
   selecting as the second quality measure a quality measure that corresponds to the selected short click measure in the second distribution.

5. The method of claim 4, wherein selecting one of the short click measures and of the long click measures comprises selecting a short click ratio and a long click ratio.

6. The method of claim 1, wherein the quality measures of resources, are determined based on feedback from one or more user.

7. A computer storage medium encoded with a computer program, the program comprising instructions that when executed by data processing apparatus cause the data processing apparatus to perform operations comprising:
   identifying user click durations corresponding to resources of a first resource quality measure and identifying user click durations corresponding to a second resource quality measure that is different from the first resource quality measure, each of the user click durations for a resource being a measure of elapsed time that the first resource is displayed at a user device following a selection of the resource;
   for each of a plurality of categories:
      determining, based on the user click durations for first resources that are each categorized as belonging to the resource category and that have a quality measure that is within a threshold range of the first resource quality measure, a short click duration specifying a first threshold click duration that is used to classify a user click duration as a short click;
      determining, based on the user click durations for second resources that are each categorized as belonging to the resource category and that have a quality measure that is within a threshold range of the second resource quality measure, a long click duration specifying a second threshold click duration that is used to classify a user click duration as a long click;

wherein the determined short click durations are different for at least two of the categories, and the determined long click durations are different for at least two of the categories; and classifying a user click duration corresponding to a selection of a resource from one of the categories based, at least in part, on the short click duration and the long click duration for the one of the categories.

8. The computer storage medium of claim 7, wherein, for each of the plurality of categories:

determining a short click duration comprises:
determining as the first threshold click duration a central tendency of click durations resulting from selections of the first resources;

determining a long click duration comprises:
determining as the second threshold click duration a central tendency of click durations resulting from selections of the second resources.

9. The computer storage medium of claim 8, the operations further comprising:

receiving a request for a content item that references a resource that belongs to one of the categories;

determining, for the resource, a short click metric and a long click metric based on click durations resulting from selections of content items referencing the resource and the short and long click durations for the category to which the resource belongs; and generating a selection score for the content item based, in part, on the short click metric and a long click metric, the selection score being used to rank the content item for selection in response to the request.

10. The computer storage medium of claim 7, wherein selecting the first quality measure and the second quality measure comprises:

determining, from resources belonging to the plurality of the categories, a first distribution of quality measures to a plurality of long click measures, each long click measure corresponding to a corresponding quality measure in the first distribution;

determining, from the resources belonging to the plurality of the categories, a second distribution of quality measures to a plurality of short click measures, each short click corresponding to a corresponding quality measure in the second distribution;

selecting one of the short click measures and one of the long click measures;

selecting as the first quality measure a quality measure that corresponds to the selected long click measure in the first distribution; and selecting as the second quality measure a quality measure that corresponds to the selected short click measure in the second distribution.

11. The computer storage medium of claim 10, wherein selecting one of the short click measures and of the long click measures comprises selecting a short click ratio and a long click ratio.

12. The computer storage medium of claim 7, wherein the quality measures of resources, are determined based on feedback from one or more user.

13. A system comprising:
a data processing apparatus; and
a computer storage medium encoded with a computer program, the program comprising instructions that when executed by the data processing apparatus cause the data processing apparatus to perform operations comprising:

identifying user click durations for resources corresponding to a first resource quality measure and identifying user click durations for resources corresponding to a second resource quality measure that is different from the first quality measure, each of the user click durations for a resource being a measure of elapsed time that the first resource is displayed at a user device following a selection of the resource;

for each of a plurality of resource categories:
determining based on the user click duration from click durations for first resources that are each categorized as belonging to the resource category and that have a quality measure that is within a threshold range of the first resource quality measure, a short click duration specifying a first threshold click duration that is used to classify a user click duration as a short click; and determining, based on the user click duration from click durations for second resources that are each categorized as belonging to the resource category and that have a quality measure that is within a threshold range of the second resource quality measure, a long click duration specifying a second threshold click duration that is used to classify a user click duration as a long click;

wherein the determined short click durations are different for at least two of the categories, and the determined long click durations are different for at least two of the categories; and classifying a user click duration corresponding to a selection of a resource from one of the categories based, at least in part, on the short click duration and the long click duration for the one of the categories.

14. The system of claim 13, wherein, for each of the plurality of categories:

determining a short click duration comprises:
determining as the first threshold click duration a central tendency of click durations resulting from selections of the first resources;

determining a long click duration comprises:
determining as the second threshold click duration a central tendency of click durations resulting from selections of the second resources.

15. The system of claim 14, the operations further comprising:

receiving a request for a content item that references a resource that belongs to one of the categories;

determining, for the resource, a short click metric and a long click metric based on click durations resulting from selections of content items referencing the resource and the short and long click durations for the category to which the resource belongs; and generating a selection score for the content item based, in part, on the short click metric and a long click metric, the selection score being used to rank the content item for selection in response to the request.

16. The system of claim 13, wherein selecting the first quality measure and the second quality measure comprises:

determining, from resources belonging to the plurality of the categories, a first distribution of quality measures to a plurality of long click measures, each long click measure corresponding to a corresponding quality measure in the first distribution;

determining, from the resources belonging to the plurality of the categories, a second distribution of quality measures to a plurality of short click measures, each short click corresponding to a corresponding quality measure in the second distribution;

selecting one of the short click measures and one of the long click measures;

selecting as the first quality measure a quality measure that corresponds to the selected long click measure in the first distribution; and selecting as the second quality measure a quality measure that corresponds to the selected short click measure in the second distribution.

17. The system of claim 16, wherein selecting one of the short click measures and of the long click measures comprises selecting a short click ratio and a long click ratio.

18. The system of claim 13, wherein the quality measures of resources, are determined based on feedback from one or more user.

\* \* \* \* \*